United States Patent [19]
Apte et al.

[11] Patent Number: 5,711,833
[45] Date of Patent: Jan. 27, 1998

[54] PROCESS FOR THE PRODUCTION OF THIN WALLED CERAMIC STRUCTURES

[75] Inventors: Prasad S. Apte, St. Albert; Ernesto S. Tachauer, Sherwood Park; Travis Kyle Solomon, Edmonton, all of Canada

[73] Assignee: Thermicedge Corporation, Fort Saskatchewan, Canada

[21] Appl. No.: 506,495

[22] Filed: Jul. 25, 1995

[51] Int. Cl.$^6$ .................. B32B 31/04; B32B 31/20; B32B 31/26
[52] U.S. Cl. ............. 156/89; 156/224; 156/246; 156/264; 264/632; 264/633; 428/34.4
[58] Field of Search ............... 156/89, 222, 224, 156/264, 246; 264/56, 62, 63, 239, 395, 632, 633, 656, 681, 682, 683; 428/34.4

[56] References Cited

U.S. PATENT DOCUMENTS

| | | | |
|---|---|---|---|
| 4,579,703 | 4/1986 | Adlerborn et al. | 264/58 |
| 4,985,103 | 1/1991 | Kouno et al. | 156/184 |
| 5,034,604 | 7/1991 | Streetman et al. | 250/251 |
| 5,256,609 | 10/1993 | Dolhert | 501/96 |

FOREIGN PATENT DOCUMENTS 2241921  9/1991  United Kingdom.

OTHER PUBLICATIONS

Raeder, Henrik, "Fabrication of thin-walled ceramic tubes by tape casting," Materials Science Monogr. (1991), 66B(Ceram. Today—Tomorrows Ceram., Pt. B), 1123-9 (Abstract only), 1991.

Microstructure-Mechanical Property Property Relation in Al$_2$O$_3$ Laminates From Proceedings of the 11th Riso International Symposium *Structural Ceramics—Processing, Microstructure and Properties*, 1990 pp. 217-224.

Tape Casting—Future Developments Ceramics Processing Research Laboratory—Report No. 33—pp. 1 to 20 plus drawing Published in Advances in Ceramics, vol. 9: "Forming of Ceramics" (1984).

Tape Casting of Ceramics, from *Ceramic Processing Before Firing*, 1978 pp. 411 to 448.

*Primary Examiner*—Melvin Mayes
*Attorney, Agent, or Firm*—Arne I. Fors

[57] ABSTRACT

A process is provided for the manufacture of thin walled ceramic structures, particularly conical or near conical shaped structures. The process involves a tape casting technique wherein a green tape is prepared from a colloidal suspension containing a ceramic powder, a binder system, a plasticizer and a solvent. The suspension is cast into a thin sheet and dried to form a pliable tape. The tape is cut into planar, shaped pieces. Non-planar components of the final structure are preformed from the cut planar tape pieces into predetermined three dimensional shapes. The planar and preformed components are sequentially assembled within a die and compacted under pressure to form a green body. The green body is subjected first, to a burnout cycle to form a brown body, and then sintered to form the unitary, cohesive, thin walled ceramic structure.

10 Claims, 1 Drawing Sheet

--- Release film
=== AlN tape

PROCESS FOR THE PRODUCTION OF THIN WALLED CERAMIC STRUCTURES

FIELD OF THE INVENTION

The present invention relates to a process for the production of thin walled ceramic structures. More specifically, the ceramic structures comprise conical members formed of a ceramic powder, particularly aluminum nitride.

BACKGROUND OF THE INVENTION

Processes for the fabrication of green bodies from which structural ceramic components are derived, include dry and/or isostatic pressing, slip casting, extrusion, tape casting and injection moulding. Such processes have been well documented in the literature. (Advances in Ceramics: Vol IX, Forming of Ceramics, Mangels J. A. and Messing G. L., American Ceramic Society Inc.,). The principal objectives of the above described processes are always to attain structural homogeneity and flawlessness, at the green body stage, because flaws and inhomogeneities generated up to this stage are irrevocably magnified during each subsequent processing step. Deleteriously, the desired homogeneity is rarely achieved and because of this major drawback, the potential structural strength of ceramic components has not yet been fully realised. Additionally, it is to be emphasized that structural inhomogeneities in the green stage will also lead to poor control over the sintered dimensions, leading to the expensive requirement for post-sintering machining steps to arrive at the finished product.

The tape casting process, considered the most economic of the above-described processes, is well known in the manufacture of ceramics for electronic applications as described by Mistler, R. E et al. (1978) Tape Casting of Ceramics, in: Ceramic Processing Before Firing, G. Y. Onoda and L. L. Hench, eds., Wiley-Interscience, 411–448.

Structural components of ceramic powders, in particular aluminium nitride, are well known and highly sought after for a combination of valuable properties. More specifically, such components exhibit high thermal conductivity together with low electrical conductivity, high strength, wear resistance and corrosion resistance properties. They find particular application in materials of construction used at high temperatures and in thin layers as substrates for electronic circuitry.

During recent years the incorporation of tape casting processes, at least during the initial fabrication steps, for the manufacture of structured ceramic components has been suggested.

In a paper entitled "Microstructure—Mechanical Property Relations in $Al_2O_3$ Laminates" by G. Burger, R. Lemay, D. J. Lloyd, T. Shaw and P. S. Apte (Proceedings of the 11th Risc International Symposium on Metallurgy and Materials Science: Structural Ceramics—Processing, Microstructure and Properties, Bentzen I. J. et al. eds, (1990) there is disclosed the preparation of a uniform green ceramic body. The preparation involves stacked formed aluminium oxide laminae which are laminated via thermocompression to form the green body. The subsequent firing schedule utilizes a well-controlled debindering cycle followed by pressureless sintering. The impetus behind the work was to discover a process functional to minimize the flaws in the products and to provide finished products exhibiting qualities superior to those formed using dry pressing techniques.

U.S. Pat. No. 5,256,609 issued to L. E. Dolbert describes a process for forming a clean burning green ceramic tape which comprises forming a slip consisting essentially of ceramic particles, a dispersant, a plasticizer, a solvent and a binder, casting said slip onto a sheet to form a tape, and drying the latter. The dried tape is separated from said sheet to thereby recover the tape and subsequently heated to densify it.

Y. Koumo et al, in U.S. Pat. No. 4,985,103 issued in 1991, describes a method of fabricating a cylindrical ceramic laminated body. The method steps include forming a ceramic green sheet on a carrier film, laminating the ceramic green sheet, applying a joining agent on the sheet and then winding the ceramic green sheet whilst simultaneously releasing it from the base plate.

However, up to the present time, it has not been considered feasible to fabricate thin walled ceramic structures utilizing tape casting techniques. In particular, the possibility of forming thin walled, shaped, cavity-containing ceramic structures, for example conical members, has been ruled out, it being deemed that such structures would lack mechanical strength. Furthermore, were such structures to be assembled from component tape pieces and formed into a green body, further processing, if possible would yield a sintered part lacking cohesivity. Additionally, the green body would be expected to be too weak to lend itself to further processing.

One application that has been suggested for the use of ceramic conical members, specifically aluminum nitride conical members, would be as replacements for the costly pyrolyric boron nitride (PBN) crucibles presently used in effusion cells. Typically, a refractory effusion cell is functional to generate a molecular beam of elemental molecules of the thin film being deposited in the crystal growth technique termed molecular beam epitaxy. An exemplary effusion cell is disclosed in U.S. Pat. No. 5,034,604 to Streetman et al. Conventionally, pyrolyric boron nitride crucibles are produced using chemical vapour deposition techniques which are not only expensive, but also labour intensive and which yield an extremely fragile product.

SUMMARY OF THE INVENTION

In accordance with the present invention there is provided a process for the production of a thin walled, cavity containing ceramic structure, said structure being assemblable from a plurality of discrete, planar and shaped three dimensional component parts. The process comprises, in combination, the steps of: preparing a colloidal suspension of a ceramic powder, having a particle size in the range of about 0.2 to 2.0 microns, in admixture with a binder system, a dispersant, a plasticizer and a solvent; casting said colloidal suspension into a thin sheet of preselected thickness; and drying said sheet to thereby form a tape having preselected pliability properties. The tape is cut into planar, shaped pieces. The non-planar portions of said ceramic structure are preformed under pressure from the cut planar tape pieces into predetermined three dimensional shapes. The planar and preformed components are assembled and, optionally layered sequentially within a forming member, are compacted and formed at preselected pressures at temperatures ranging from between about 20° C. to 75° C. for a time effective to laminate said tape components and form a unitary green body. The green body is heated at a controlled rate, at temperatures effective to remove the pyrolysable suspension additives and form a brown body, and sintered at temperatures in the range of about 1400° to 2200° C. for a time in the range of about 0.5 to 3 hours to thereby form the unitary, thin walled, cavity-containing ceramic structure.

The process has been found to be successful because in sequentially assembling the planar and preformed components and compacting them in a forming member, such as a die, and subsequently processing the assemblage as described hereabove, a cohesive, unitary non-disintegratable product is obtained. The product has dimensional control due to the reproducibilty of the process. This somewhat surprising result lies in the discovery that the tape was found to exhibit unexpected strength and formability. Furthermore the green body retains its shape, form and cohesivity following the debinding step (i.e. the burnout cycle).

Advantageously, utilizing the process described supra, in a preferred embodiment of the invention, the produced aluminum nitride crucibles are functional to replace the pyrolytic boron nitride crucibles presently used in molecular beam epitaxy are provided. It is to be noted that the aluminum nitride crucibles exhibit improved properties, namely increased flexural strength and thermal conductivity over the prior art pyrolyric boron nitride units. The invention extends to processes for the fabrication of various articles, for example, flanged pipes, tees and the like.

DESCRIPTION OF THE DRAWINGS

The method of the invention will now be described with reference to the accompanying figures, in which.

DESCRIPTION OF THE PREFERRED EMBODIMENT

Figure 1:
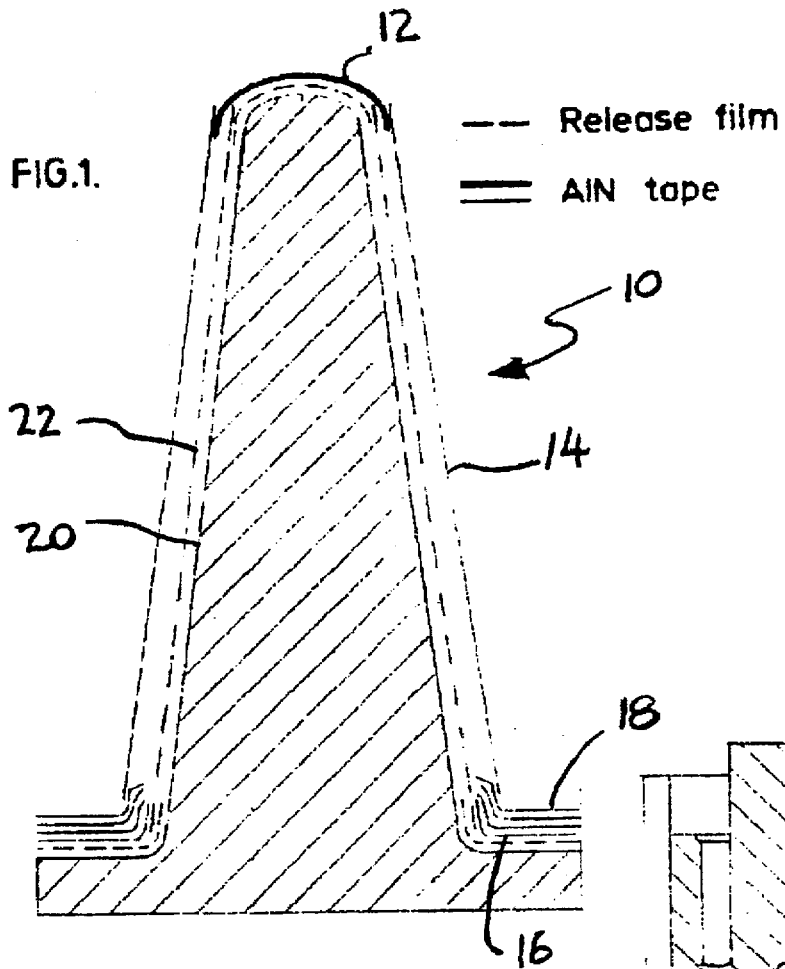
FIG. 1 is a side sectional view of the assemblage of conical components.

Having reference to the accompanying drawings, a method of fabrication of thin walled, ceramic structures, in particular conical members, will now be described.

A colloidal suspension (slurry) of a ceramic powder in admixture with a pyrolysable binder, a pyrolysable dispersant, a pyrolysable plasticizer and a volatile solvent, preferably organic, is initially prepared. In colloidal processing, the ceramic powder is first milled in a slurry to break down soft agglomerates present in the starting powder, separate the fine particles and obtain a uniform distribution of the powder within the slurry. Once this is achieved, binders and plasticizers are added and mixed until dissolved in the slurry.

Any suitable sinterable ceramic powder, selected from aluminium nitride, zirconium oxide, aluminium oxide, silicon carbide, silicon nitride and the like may be utilized. One of the preferred ceramic powders, aluminium nitride, is available from Tokuyama America Inc. The particle size of the ceramic powder ranges from 0.2 to 2.0 micrometers (microns). The amount of ceramic powder utilized is such as to make up approximately fifty percent of the volume of the green body and approximately one hundred percent of the sintered component. One exception is that wherein a sintering aid is used, this requirement being easily determined by one skilled in the art. In such cases, the sintering aid content would range from about three to five percent. Exemplary sintering aids include metal oxides, such as yttrium oxide, calcium oxide, boron, carbon, or boron carbide.

The binder, is selected from polymerized alcohols, or butyryl and acrylic resins, such as polymethylmethacrylate. The binder content ranges from 5 to 10 weight percent of the slurry.

A suitable pyrolysable dispersant, in an effective amount ranging from 0.5 to 3.0 weight percent of the slurry, is selected from the phosphate esters, ethoxylate of castor oil, menhaden or fish oils, and polyethylene oxyethanol.

Suitable pyrolysable plasticizers such as butylbenzyl phthalate (Santicizer 160™), polyethylene glycol, or various phthalates such as diethylene, triethylene or dioctyl phthalate, are added to the slurry in amounts ranging from between about 1.5 to 5 weight percent of the slurry.

Appropriate solvents would include toluene, methyl ethyl ketone or ethanol or combinations thereof. However, the range of solvents usable in tape casting processes are extensive and also include various alcohols exemplary of which are isopropanol, methanol, as well as hexane, ethyl acetate and trichloroethylene. The solvent content of the slurry ranges from about 25 to 35 weight percent.

The thus formed colloidal suspension is poured onto a release film, such as silicone-coated Mylar™ film, to form a sheet, using a doctor blade to control the sheet thickness. The sheet is dried at ambient temperature, the solvents being evaporated under a fume hood, to form a tape. The dried tape is separated from the release film.

These dried polymer tapes wherein the ceramic powder is uniformly dispersed form the "building blocks" which are used to create the thin walled, three dimensional, hollow or partially hollow ceramic structures.

The pliability properties of the thus formed tapes can be adjusted by varying the amount and composition of the slurry additives, in particular the binder and plasticizer.

The formed tape would have a thickness ranging from 0.1 to 2 millimeters thick, but for this application typically the thickness would be about 0.45 millimeters.

The desired shapes are then punched, or cut, from the tape using conventional equipment.

Figure 2:
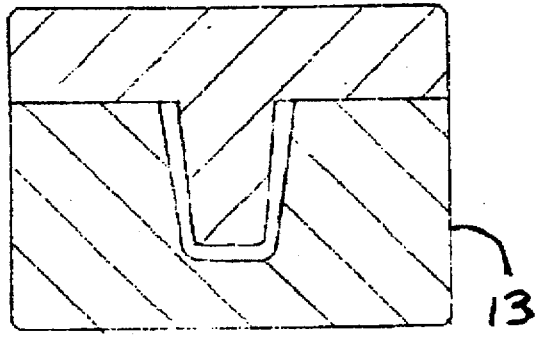
FIG. 2 is a side sectional view of the die for forming the conical tips.
Figure 3:
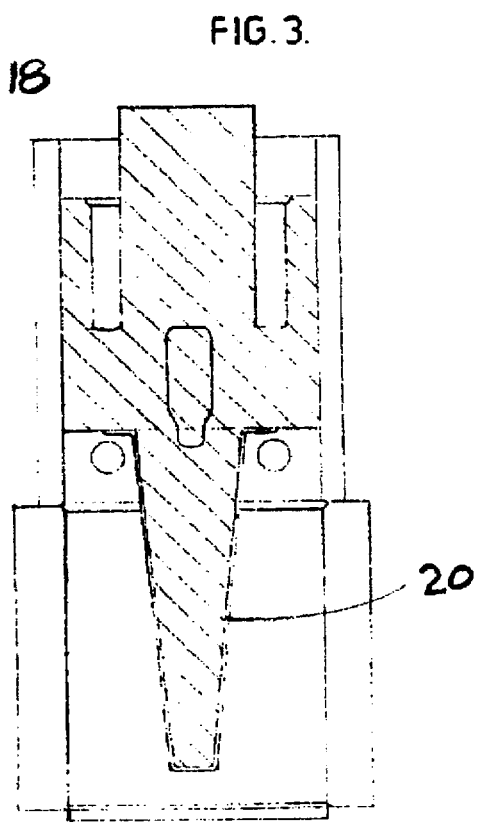
FIG. 3 is a side sectional view of the die utilized in forming the cone.

For manufacturing purposes, the cone 10 is divided into four component parts shown in FIG. 1, namely tip 12, mantle 14, circular base part 16 and flange 18. The tip 12 is preformed by cold pressing in the die 13 typified in FIG. 2. The mantle 14 is obtained by wrapping a fan shaped piece of tape onto the mould 20 of FIG. 1 and 3. The circular base part 16 and flange 18 are cut as rings of different sizes. Suitably sized rings are slid down to the bottom of the male side of the lamination die to form the circular bottom part 16. Similar rings are applied to the female side of the lamination die to form the flange 18. The components are assembled sequentially on a release film 22 on mould 20,, namely tip 12, bottom circular part 16, and mantle 14, while flange 18 is assembled on the female side of the die, and the die is compacted by a press (not shown).

The compaction (lamination) force depends upon the cross-sectional area of the part and can be estimated based on the information provided in the example below. Compaction temperature ranges from about 20° C. to 75° C. Preferably, compaction is undertaken at ambient temperature for about five minutes.

At this stage the green body, which is relatively soft, may be machined, usually to provide finer details such as chamfered edges and the like.

The green body is then heated, at a controlled rate, or as stated otherwise in an incremental predetermined stepped rate, in air, up to temperatures ranging from about 300° C. to 600° C., for a time ranging from 8 to 24 hours. This heating stage, termed the burnout cycle, is effective to remove the pyrolysable organic additives by thermal decomposition thereby forming a 'brown' body. The heating is conducted slowly so as to burn off or decompose the organics without introducing cracks or blisters into the part. The brown body consists of a close packed ceramic powder and is fragile, unitary, retains the shape of the green body and retains sufficient strength to be subjected to the next step.

The brown body is then sintered in a sintering furnace in an atmosphere which is determined by the composition of the ceramic powder. Typically, a stream of nitrogen, air or argon at atmospheric pressure may be utilized, the selection of which is straightforward to one skilled in the art. The sintering temperature, which again depends upon the nature of the selected ceramic powder, ranges from 1750° to 2200° C., for a time in the range of about 0.5 to 3 hours, to thereby obtain a thin walled, completed ceramic structure.

The variables controlling the sintered dimensions include the degree and uniformity of shrinkage during sintering, the density of the green part and the dimensions of the pressed green part.

The product and process of the invention will now be described with reference to the following non-limitative examples.

EXAMPLE I

The following is an example of how the process of tape casting and lamination can be used to make a thin walled ceramic structure which requires a close degree of tolerance in its dimensions. AlN powder with a particle size of 2 microns, Y$_2$O$_3$ powder of approximately the same size, Emphos™ phosphate ester (dispersant), toluene and methyl ethyl ketone were placed in a milling jar in the fractions indicated in Table 1 given herebelow. The milling jar was fabricated from nylon and the milling media consisted of nylon coated stainless steel balls. The mixture was then milled for 1 to 3 hours. The slurry was poured into a beaker and a suitable binder, in this case Elvacite™ polymethacrylate and a plasticizer, in this case Santicizer 160™ (butylbenzyl phthalate), were added to the mixture in the ratio indicated in Table 1. This mixture was stirred for 16 hours to dissolve the binder and plasticizer and obtain a homogeneous mixture. The slurry was cast onto a silicone-coated Mylar™ film using a doctor blade such that the thickness of the wet slurry was 0.9 mm. The slurry was dried in air under a fume hood for at least 24 hours to form a tape. The dried thickness was 0.45 mm. Forms were cut from the tape and as described previously the cone was assembled within the die like that shown in FIG. 3, the tip having first been preformed by cold pressing a stack of twelve discs in a die like that shown in FIG. 2. The filled die was placed in a press (not shown) and the tape components were laminated together using a total force of 50,000 lbs. This pressure was held for 5 minutes and pressing was done at room temperature. The green parts were placed on top of a boron nitride plate in a furnace and all the organic additives were burned off by heating the green laminated body in a stream of air according to the schedule listed in Table II given herebelow. At this point the resulting brown body was fairly fragile. It was carefully transferred to a sintering furnace where it was placed on a boron nitride plate inside a boron nitride crucible. The crucible was necessary to protect the body from carbon introduced by contact with the graphite elements in the furnace. The sintering cycle listed in Table III below was then employed. The furnace chamber was first evacuated and the brown body sintered under conditions of flowing nitrogen at atmospheric pressure in order to obtain a thin walled part. The part made using this process showed remarkable consistency.

TABLE I

| COMPOUND | WEIGHT % (in suspension) | VOLUME % (in dried tape) |
| --- | --- | --- |
| Aluminum nitride | 55.0 | 57.3 |
| Yttrium oxide | 1.7 | 1.2 |
| Elvacite ™ | 8.0 | 27.3 |
| Santicizer 160 ™ | 2.4 | 7.4 |
| Emphos ™ | 1.9 | 6.4 |
| Methyl ethyl ketone | 23.2 | N/A |
| Toluene | 7.7 | N/A |

TABLE II

| Temperature Range (°C.) | Action | Heating Rate (°C./min) | Hold Time at Maximum Temperature (min.) |
| --- | --- | --- | --- |
| 20–165 | heating | 1.0 | 90 |
| 165–200 | heating | 0.1 | 60 |
| 200–325 | heating | 0.4 | 60 |
| 325–580 | heating | 1.0 | 60 |
| 580–20 | cooling | furnace cool | — |

Table II provides a burnout schedule used for AlN green parts, burnout being carried out in air at atmospheric pressure.

TABLE III

| Temperature Range (°C.) | Action | Heating Rate (°C./min) | Hold Time at Maximum Temperature (min.) |
| --- | --- | --- | --- |
| 20–1250 | heating | 20 | 0 |
| 1250–1450 | heating | 2 | 60 |
| 1450–1815 | heating | 2 | 180 |
| 1815–20 | cooling | 14 | — |

Table III illustrates the sintering schedule used to sinter AlN structures, sintering being carried out in flowing nitrogen at atmospheric pressure.

It will be understood, of course, that other embodiments and examples of the invention will be readily apparent to a person skilled in the art, the scope and purview of the invention being defined in the appended claims.

The embodiments in which an exclusive property or privilege are claimed are defined by the claims which now follow:

1. A process for the production of a thin walled, cavity containing ceramic structure, said structure being assemblable from a plurality of predetermined discrete planar and non-planar component parts, which comprises, in combination, the steps of: preparing a colloidal suspension of a ceramic powder, having a particle size in the range of about 0.2 to 2.0 microns, in admixture with a binder, a dispersant, a plasticizer and a solvent; casting said colloidal suspension into a thin sheet of preselected thickness; air drying said sheet to thereby form a tape having a preselected pliability properties; cutting planar, shaped pieces for planar and non-planar components from said tape; preforming under pressure from said planar, shaped tape pieces cut for the non-planar components, the non-planar component parts of said ceramic structure into predetermined three dimensional shapes; assembling, and optionally layering, the planar and non-planar components sequentially about a forming member, and compacting and forming said components at preselected pressures, and at temperatures ranging from between about 20° C. to 75° C. for a time effective to laminate said components and form a green body; heating said green body at a controlled rate, at temperatures effective to remove the pyrolysable suspension additives and form a brown body; and sintering said brown body at temperatures in the range of about 1400° to 2200° C. for a time in the range of about 0.5 to 3 hours to thereby form the unitary, thin walled, cavity containing ceramic structure.

2. A process as set forth in claim 1 wherein said ceramic powder is selected from aluminium nitride, zirconium oxide, aluminium oxide, silicon carbide or silicon nitride or mixtures thereof.

3. A process as set forth in claim 2 wherein said colloidal suspension further includes a sintering aid selected from one or more metal oxides, boron or carbon or boron carbide.

4. A process as set forth in claim 1 wherein said binder is selected from polymerized alcohols, butyryl resins or acrylic resins.

5. A process as set forth in claim 1 wherein said dispersant is selected from phosphate esters, ethoxylate of castor oil or polyethylene oxyethanol.

6. A process as set forth in claim 1 wherein said plasticizer is selected from butylbenzyl phthalate, polyethylene glycol, diethylene phthalate or triethylene phthalate.

7. A process as set forth in claim 1 wherein said solvent is selected from toluene, methyl ethyl ketone, ethanol, isopropanol, methanol, hexane, ethyl acetate, or trichloroethylene or mixtures thereof.

8. A process as set forth in claim 1 wherein said ceramic powder is selected from aluminium nitride, zirconium oxide, aluminium oxide, silicon carbide or silicon nitride or mixtures thereof, said binder is selected from polymerized alcohols or butyryl or acrylic resins, said dispersant is selected from phosphate esters, ethoxylate of castor oil or polyethylene oxyethanol, said plasticizer is selected from butylbenzyl phthalate, ethylene glycol, diethylene phthalate or triethylene phthalate, and said solvent is selected from toluene, methyl ethyl ketone, ethanol, isopropanol, methanol, hexane, ethyl acetate, or trichloroethylene or mixtures thereof.

9. The process as set forth in claim 8 wherein said colloidal suspension includes a sintering aid selected from one or more metal oxides, boron or carbon.

10. A process as set forth in claim 1 wherein said ceramic powder comprises aluminium nitride, said binder is a copolymer selected from n-butylmethacrylate or isobutyl methacrylate , said dispersant is a phosphate ester, said plasticizer is butylbenzyl phthalate, said sintering aid is yttrium oxide and said solvent is toluene and methyl ethyl ketone in admixture.

* * * * *